United States Patent
Sommer

(10) Patent No.: US 6,554,732 B1
(45) Date of Patent: Apr. 29, 2003

(54) DIFFERENTIAL ASSEMBLY WITH MODIFIED LIMITED SLIP CLUTCH ARRANGEMENT

(75) Inventor: Randy L. Sommer, Monroeville, IN (US)

(73) Assignee: Spicer Technology, Inc., Fort Wayne, IN (US)

(*) Notice: Subject to any disclaimer, the term of this patent is extended or adjusted under 35 U.S.C. 154(b) by 34 days.

(21) Appl. No.: 09/861,656

(22) Filed: May 22, 2001

(51) Int. Cl.[7] ............................................... F16H 48/06
(52) U.S. Cl. ...................................................... 475/221
(58) Field of Search ................................ 475/150, 221, 475/223

(56) References Cited

U.S. PATENT DOCUMENTS

| | | | |
|---|---|---|---|
| 3,448,635 A | 6/1969 | Nelson | |
| 3,453,905 A | 7/1969 | Schmid | |
| 4,266,445 A | 5/1981 | Goscenski | |
| 5,176,589 A | * 1/1993 | Borguld | 475/221 |
| 5,310,382 A | 5/1994 | Guimbretiere | |
| 5,350,340 A | 9/1994 | Paul | |
| 5,520,589 A | 5/1996 | Dewald | |
| 5,559,286 A | 9/1996 | White | |
| 5,582,557 A | 12/1996 | Dissett | |
| 5,785,622 A | * 7/1998 | Perry | 475/84 |
| 6,120,407 A | * 9/2000 | Mimura | 475/225 |

\* cited by examiner

Primary Examiner—Dirk Wright
(74) Attorney, Agent, or Firm—Liniak, Berenato & White

(57) ABSTRACT

A limited slip differential having a modified clutch pack mechanism located outside of the differential case. The mechanism include a planetary gear assembly disposed between a side gear and the clutch pack to facilitate the application of greater torque. A rotatable collar and cup-shape member together with a pair of planetary gear sets establish a driving connection through the differential case between the side gear and the clutch pack. Clutch plates are alternatively splined on the cup-shaped member and differential case to facilitate selectively coupling therebetween. The incorporation of the external clutch pack and planetary gear set facilitate the use of a greater diameter clutch plates resulting in greater torque capability.

6 Claims, 3 Drawing Sheets

DIFFERENTIAL ASSEMBLY WITH MODIFIED LIMITED SLIP CLUTCH ARRANGEMENT

FIELD OF THE INVENTION

This invention is directed to the field of limited slip differentials of the type for connecting a vehicle's driving shaft to a pair of driven shafts, more particularly to a modified clutch pack mechanism located outside the differential case in a housing extension.

BACKGROUND OF THE INVENTION

The present invention relates to an improved limited slip differential, of the type used in automotive applications, offering greater torque than achievable with conventional limited slip differentials. Limited slip differentials, as known in the art, are necessary for good traction. For example, when an automobile goes around a corner, the outer driving wheel must be turned at a greater speed than the inner one. This is achieved through the differential. It lies midway between the two driving wheels, linked to each wheel by a half-shaft turned through a bevel gear. The half-shafts have sun gears connected by free-wheeling planet pinions. When traveling straight, the planet pinions do not spin and drive both half-shafts at the same speed. As the automobile corners, the planet pinions do spin, driving the sun gear and half-shafts at different speeds.

Such differential systems have been improved over the years. Of particular concern to automotive engineers is the problem of traction, such as when one driving wheel encounters ice, mud, or snow, and the like. In straight, dry driving conditions, the differential supplies equal torque to each half-shaft. However, when adverse driving conditions are encountered, such as operating on a slippery surface, prior art differentials, supplying equal torque to the driving wheels resulted in reduced traction even when only one driving wheel was exposed to the slippery road surface. This dangerous condition resulted in the development of differential systems that introduced a torque to the system.

The prior art contains a number of references directed to improvements to limited slip differential systems, especially as to safety performance in the operation of vehicles so equipped with the systems. A first type of limited slip differentials to which improvements have been proposed are those which include a pair of aligned driven shafts, having side gears splined thereto, where rotation of a drive shaft is transmitted through a differential case and spider gears to the respective side gears. Further, each driven shaft includes a clutch pack, with interleaved clutch plates, where the plates are alternately splined to the case and the side gears. In operation, rotation is transmitted from the case through the clutch plates to the side gear to increase the torque of the driven shaft of the wheel having the greater traction and thereby rotate the wheel having the greater traction.

A second type of limited slip differentials are those which incorporate a single multi-plate clutch assembly that is operably connected to the pair of driven shafts. The clutch assembly is actuated in response to the magnitude of speed differentiation between the pair of driven shafts.

a.) One type of differential assembly employs a hydraulically-operable locking differential having a friction-pack arrangement for locking an output shaft and associated side gear with the differential housing. In the invention use is made of a piston-cylinder motor the axis of which is colinear with the output shaft. The advantage, therefore, is that the locking operation may be effected while the drive and output shafts are rotating without stopping the vehicle.

b.) another assembly relates to a vehicle friction material condition measurement system that includes a sensor which responds to both changes in working length and temperature. The sensor is embedded in a friction lining to provide a signal indicative of both wear and temperature to an electronic control unit which interprets long term averaged change in the sensor resistance. Such resistance may be measured when the vehicle is stationary as lining wear and short term changes in sensor resistance are representative of lining temperature.

c.) a third assembly is directed to an automotive differential gear arrangement with a driven rotatable differential housing wheel driving opposed bevel gears within the housing, differential bevel gears in driving engagement with the opposed bevel gears, and a clutch between the housing and one of the shafts of the opposed bevel gears for partially or completely blocking the differential gear arrangement. The clutch is a cone clutch disposed between the bearings supporting the housing, with a frictional surface mean diameter that is larger than the internal diameter of the housing, and is provided with a spring for constant biased engagement. Also, wedging means are provided to increase the clutch frictional engagement upon relative rotation between clutch surfaces.

d.) a fourth assembly teaches a limited slip differential mechanism which is engageable or disengageable at the option of the vehicle operator. The mechanism operates through a friction disk clutch arrangement, which controls the relative rotative speeds of the vehicle wheels and related axle shafts, while permitting a release of the friction disk clutch arrangement and relative rotation of the vehicle wheels, and related axle shafts upon predetermined road conditions and vehicle operation.

While the foregoing prior art disclose the use of a limited slip clutch pack located outside the main cavity of the differential case, they fail to disclose The manner by which the present invention is capable of achieving the greater torque, and hence improved safety, will become apparent from the following specification, particularly when read in conjunction with the accompanying drawings.

SUMMARY OF THE INVENTION

This invention relates to a limited slip differential assembly for the operative rotation of a pair of aligned driven wheel axles of a vehicle, where the assembly provides greater torque capability to the vehicle by the ability to use larger than conventional sized clutch plate sets. The assembly comprises a case supporting at least one pinion gear and side gears driven to rotate about an axis by the at least one pinion, where each side gear drives a respective axle. The modified assembly includes a case containing at least one pinion gear and side gears, a planetary gear set, and means for driving a pair of driven wheels. Further, the housing includes an extension surrounding one of the driven wheels, where the driven wheel mounts a large diameter clutch pack set consisting of alternating metal plates, such as made of steel, and friction discs within the housing extensions. The assembly further includes a gear set between the case and the clutch pack set, where the gear set comprises an outer ring gear, an inner ring gear, and plural planetary gears therebetween in rotative relationship with the outer and inner ring gears. Further, the clutch pack set is sandwiched between a pair of spring biased pressure pads, which are mounted within a rotating plate, where the metal plates of the clutch pack are secured for rotative movement by the rotating plate.

The present invention is directed to a limited slip differential assembly that offers greater torque capability through the use of larger than conventional clutch plates. A pair of planetary gears disposed between a side gear and a rotatable collar, which in turn is disposed about an inner extension of the differential case with the clutch plates splined thereto. By this unique arrangement, the clutch plates are located outside of the differential case and results in a limited slip differential capable of receiving clutch plates of a much larger diameter than with conventional limited slip differentials, to thereby allow for greater torque.

DETAILED DESCRIPTION OF PREFERRED EMBODIMENT

Figure 1:
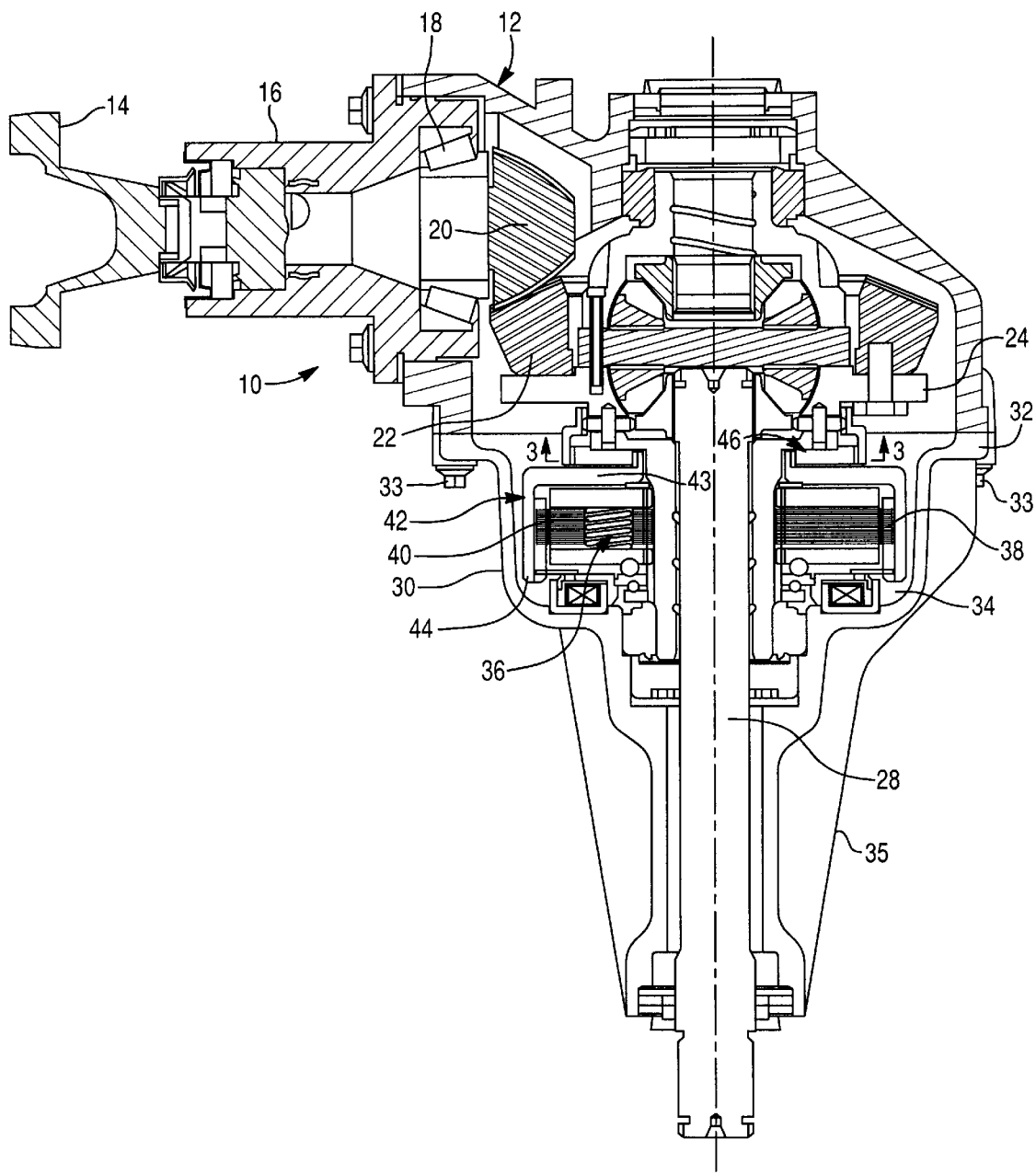
FIG. 1 is a sectional view of a limited slip differential case with a housing, incorporating the modified clutch pack mechanism of this invention.

The present invention relates to high torque, limited slip differential assemblies by the provision of a housing extension for a driven wheel for receiving a clutch pack mechanism having large diameter metal plates and friction pads. The invention will now be described with regard to the several Figures, where like reference numerals represent like components or features throughout the several views.

Before reviewing the details of the present invention, a brief understanding of the operation of a limited slip differential, as known in the art, may be helpful in the understanding of the contributions of this invention. Differential systems, as found in vehicular applications, have three major functions:

a. aim the engine power at the wheels, b. acts as the final gear reduction in the vehicle, slowing the rotational speed of the transmission one final time before it hits the wheels, and c. transmits the power to the wheels while allowing them to rotate at different speeds.

However, conventional differentials do not provide adequate traction of the driven wheels on slippery surfaces, such as ice, mud, gravel, etc. Limited slip differentials were thus developed to provide a driving force to both driven wheels at all times. It transfers a portion of the driving torque to both the slipping wheel and the driven wheel. The preferred types of limited slip differentials use a clutch pack which consist of plural friction discs sandwiched between metal plates, such as steel, traditionally provided within the differential case. The friction discs are usually splined to and turn with the side gears, whereas the metal plates have tabs which lock into, i.e. splined to corresponding notches in the rotating case. The plates turn with the case. Further, a spring member, such as belleville springs, coil springs or leaf springs, may be employed to force the friction discs and metal plates together. That is, the spring member pushes the side gears against the clutch plates, which as noted above with regard to the metal plates, are fixed to the differential case. Alternately, hydraulic means may be provided to apply pressure to the clutch plates. In either situation, both side gears spin with the case when both driven wheels are moving at the same speed, and the clutch pack is not really needed. The only time the clutch pack comes into play is when something happens to make one wheel spin faster than the other, a situation such as may be encountered with ice. If one wheel wants to spin faster than the other, it must first overpower the clutch. The stiffness of the spring member or hydraulic mechanism, combined with the relative friction of the clutch set, will determine how much torque it takes to overpower it.

Figure 2:
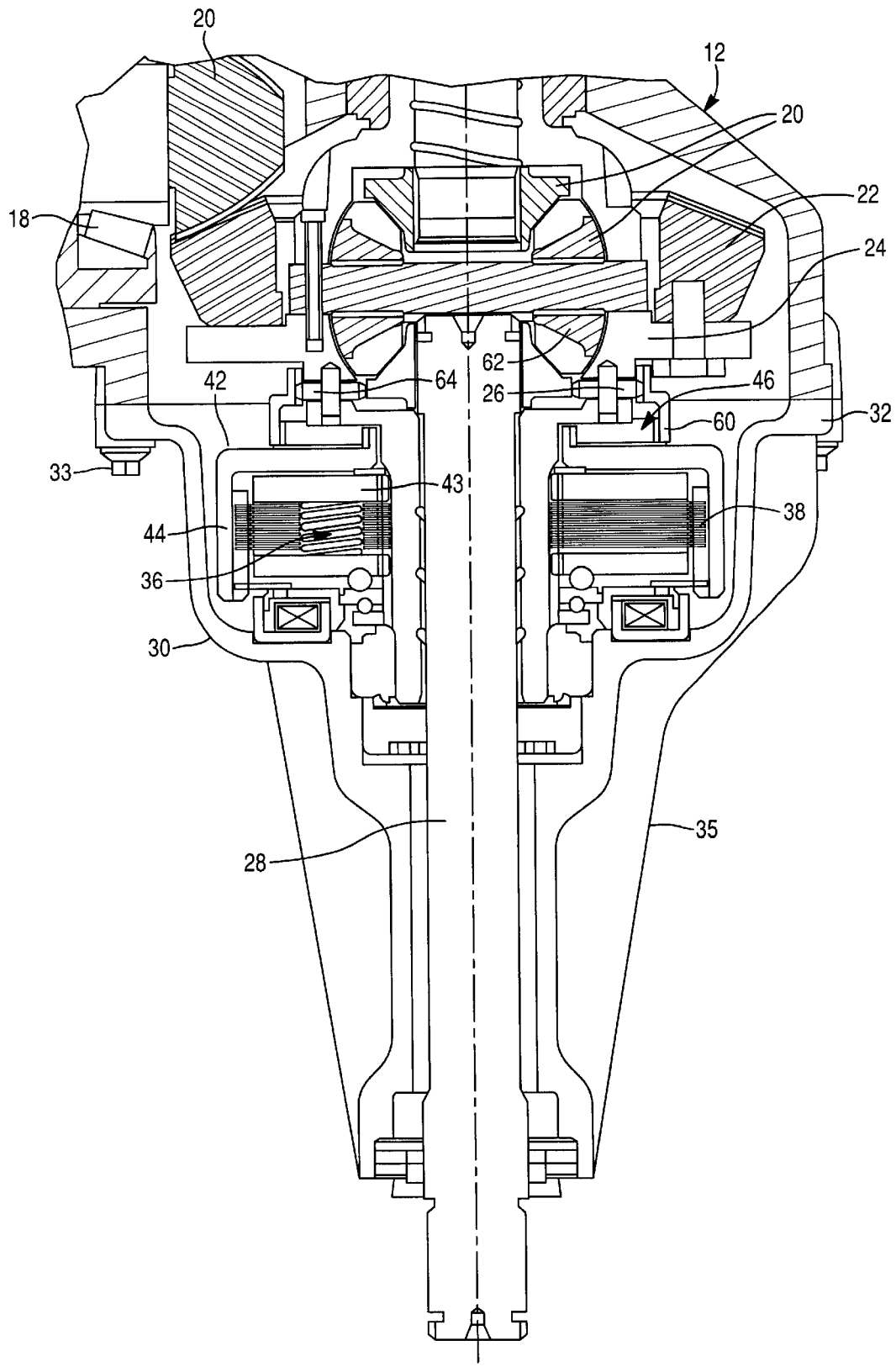
FIG. 2 is an enlarged, partial sectional view of the limited slip differential case and housing with the modified clutch pack mechanism of FIG. 1.

Turning now to the three Figures, FIGS. 1 and 2 illustrate, primarily in section, a limited slip differential 10 modified by the teachings of this invention. The modified limited slip differential comprises a differential housing 12 featuring a pinion yoke 14 to receive and be driven by a drive shaft, as known in the art. The pinion yoke 14 comprises a carrier 16, splined for connecting to the drive shaft (not shown), and supported for rotation by tapered roller bearings 18, and finally terminating in a pinion gear 20, where the pinion gear is in gear meshing relationship with ring gear 22 to effect rotation thereof. The ring gear 22 in turn is in driving connection with a differential case 24. The differential case 24 in turn drives a pair of side gears 26 through a pair of associated pinon gears as is known in the art. The respective axle side gears 26 are splined to and drive the pair of aligned drive axles 28 (only one of the drive axles being is shown in full.)

The present invention provides a housing extension 30 within which is the first drive axle 28 for the driven wheel associated therewith, not shown. The housing extension 30, generally cone-shaped, comprises a first end 32 having an internal cavity 34, where the first end 32 is secured to the differential housing 12, such as by bolt members 33. To give added strength to the extended housing 30, supporting ribs 35 may be provided. The extended housing 30 provides for a clutch pack assembly 36 located outside of the differential case 24. The clutch pack assembly 36 includes plural, alternating friction pads and metal plates 38, and a biasing spring 40, as known in the art. Further, the clutch pack assembly 36 is secured within a circular cup-shaped member 42 rotatably disposed about an extension of the differential case 24. The cup-shaped member 42 has a first wall 43 extending normal to the first drive shaft 28, and an outer circumferential wall 44 where the metal plates 38 are secured thereto in a non-rotatable axially sliding relationship. The housing extension 30, as seen in FIGS. 1 and 2, is preferably tapered from the housing 12 toward the axle bearings, which in turn connect to the wheels (not shown).

Intermediate the clutch pack assembly 36 and side gears 26, as described above, is a planetary gear assembly. The planetary gear assembly includes a collar 60 rotatably disposed about a portion of the differential case 24. A first set of planetary gears 62 (one shown in FIGS. 1 & 2) are each rotatably mounted to the differential case 24 and engagingly disposed between one side gear 26 and the rotatable collar 60. A second set of planetary gears 64 (one shown in FIGS. 1 & 2) are each rotatably mounted to the differential case and engagingly disposed between the collar 60 and cup-shaped member 42. Each of the first and second planetary gear sets 62/64 orbit about the axle shaft 28 as the differential case 24 rotates and may separately rotate relative to the differential case 24. The resultant planetary gear assembly disposed between the side gear 26 and cup-shaped member 42 facilitates an increased torque applied by the clutch pack assembly 38 and thus increases the performance of the limited slip device.

The second planetary gear set (preferably four in number) 64 is disposed adjacent the first wall 43 and engages a gear ring formed on an extension there from. Each gear of the planetary gear set 64 may be simply rotatably mounted to the external surface of the differential case 24. The first planetary gear set 62 may be mounted interior of the differential case or may employ a gear rotatably mounted about a pin inserted through a bore formed through the external surface of the differential case 24. The size of each of the first and second planetary gears 62, 64, and each of their respective radial locations may be sized to optimize the torque applied to the side gear 26 and thus enhance the slip limiting performance between the side gear 26 and differential case 24. Specifically, the arrangement of the planetary gear assemblies disposed between the side gear and the clutch device can have a force multiplying effect thereby enhancing the performance of the limited slip device.

Figure 3:
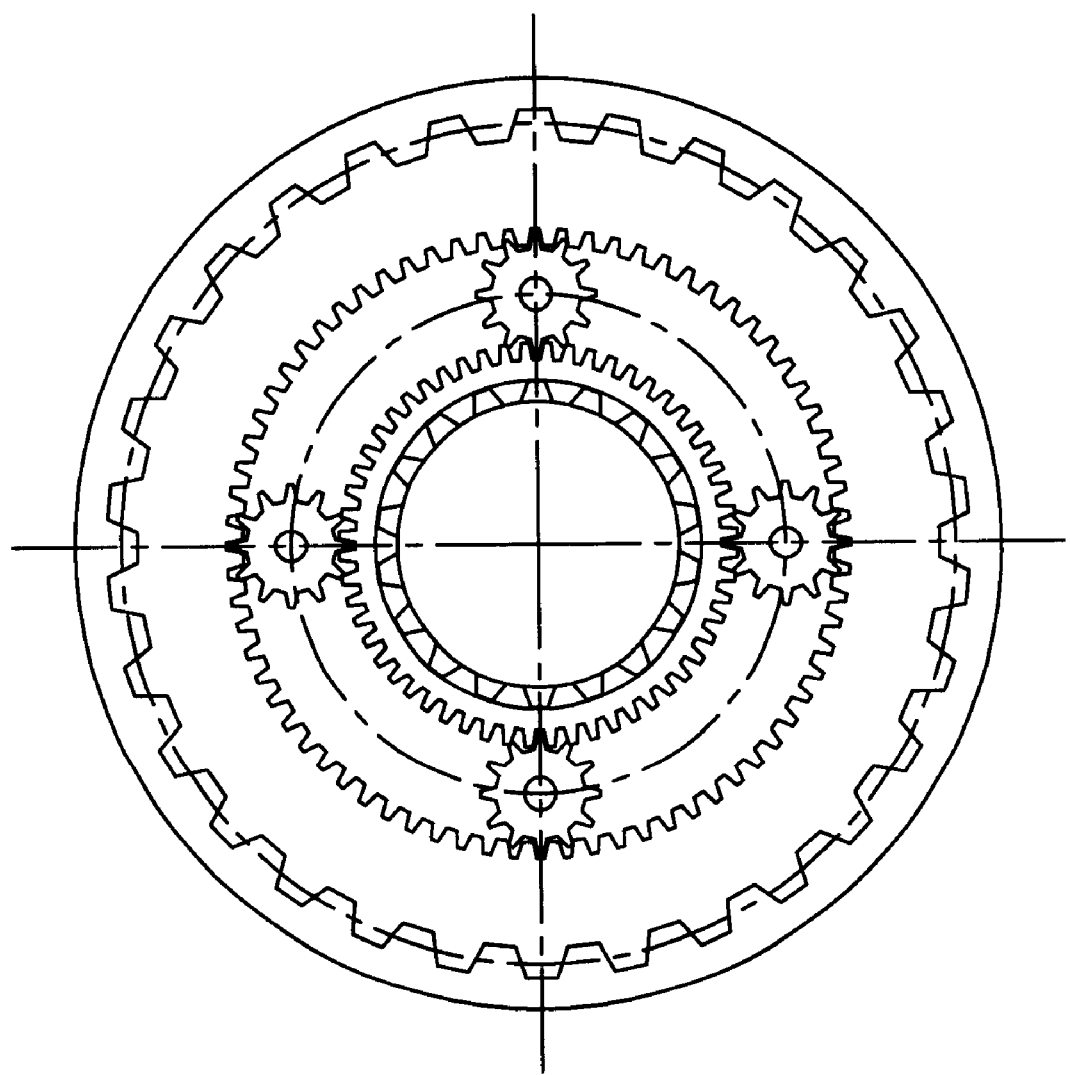
FIG. 3 is a sectional view showing a gear set, taken along line 3—3 of FIG. 1.

The section shown in FIG. 3 is a radial section of the differential assembly showing one of the planetary gear sets.

While the foregoing invention has been shown and described with reference to a preferred embodiment, it will be understood by those possessing skill in the art that various changes and modifications may be made without departing from the spirit and scope of the invention.

What is claimed is:

1. A differential axle assembly disposed within a housing, said assembly comprising:
   a differential case driven by an input shaft and adapted to allow differential rotational speed between a pair of output shafts;
   a gear assembly disposed within said differential case to facilitate said differential rotation between said output shafts, said gear assembly including a pair of side gears each secured to a corresponding one of said output shafts;
   a clutch device disposed between said differential case and one of said side gears for selectively coupling said one of said side gears shafts to said differential case and thereby the other output shaft; and
   a planetary gear assembly disposed between said one of said side gears and said clutch device, said planetary gear assembly comprising at least one planetary gear set rotatably mounted on said differential case.

2. A differential axle assembly disposed within a housing, said assembly comprising:
   a differential case driven by an input shaft and adapted to allow differential rotational speed between a pair of output shafts;
   a gear assembly disposed within said differential case to facilitate said differential rotation between said output shafts, said gear assembly including a pair of side gears each secured to a corresponding one of said output shafts;
   a clutch device disposed between said differential case and one of said side gears for selectively coupling said one of said side gears shafts to said differential case and thereby the other output shaft; and
   a planetary gear assembly disposed between said one of said side gears and said clutch device,
   wherein said planetary gear assembly comprises
      a collar rotatably mounted about said differential case;
      a first planetary gear set rotatably mounted to and extending through said differential case to engagably connect said one of said side gears to said collar;
      a cup-shaped member rotatably disposed about an extension of said differential case; and
      a second planetary gear set disposed between said cup-shaped member and said collar.

3. A differential axle assembly disposed within a housing, said assembly comprising:
   a differential case driven by an input shaft and adapted to allow differential rotational speed between a pair of output shafts;
   a gear assembly disposed within said differential case to facilitate said differential rotation between said output shafts, said gear assembly including a pair of side gears each secured to a corresponding one of said output shafts;
   a clutch device disposed between said differential case and one of said side gears for selectively coupling said one of said side gears shafts to said differential case and thereby the other output shaft; and
   a planetary gear assembly disposed between said one of said side gears and said clutch device,
   wherein said clutch device is disposed external said differential case and within an extension of said housing.

4. The limited slip differential assembly according to claim 2, wherein said clutch device includes a plurality of clutch plates alternatively splined on said cup-shaped member and said extension of said differential case to facilitate selectively coupling therebetween.

5. The limited slip differential assembly according to claim 2, wherein said extension is cone-shaped, and includes strengthening ribs along an external length thereof.

6. The differential axle assembly according to claim 3, wherein said planetary gear assembly comprises
   a collar rotatably mounted about said differential case;
   a first planetary gear set rotatably mounted to and extending through said differential case to engagably connect said one of said side gears to said collar;
   a cup-shaped member rotatably disposed about an extension of said differential case; and
   a second planetary gear set disposed between said cup-shaped member and said collar.

* * * * *